US012564922B2

(12) United States Patent
Yang

(10) Patent No.: US 12,564,922 B2
(45) Date of Patent: Mar. 3, 2026

(54) RATCHET WRENCH STRUCTURE

(71) Applicant: Cheng-Pu Yang, Changhua County (TW)

(72) Inventor: Cheng-Pu Yang, Changhua County (TW)

( * ) Notice: Subject to any disclaimer, the term of this patent is extended or adjusted under 35 U.S.C. 154(b) by 410 days.

(21) Appl. No.: 18/365,413

(22) Filed: Aug. 4, 2023

(65) Prior Publication Data

US 2025/0042006 A1 Feb. 6, 2025

(51) Int. Cl.
*B25B 23/00* (2006.01)
*B25B 15/04* (2006.01)

(52) U.S. Cl.
CPC .......... *B25B 23/0035* (2013.01); *B25B 15/04* (2013.01)

(58) Field of Classification Search
CPC ..... B25B 13/46; B25B 13/461; B25B 13/462; B25B 13/463; B25B 13/465; B25B 13/466; B25B 13/48; B25B 15/04; B25B 23/0057; B25B 23/12; B25B 23/142; B25B 23/0035
See application file for complete search history.

(56) References Cited

U.S. PATENT DOCUMENTS 3,538,792 A * 11/1970 Stillwagon, Jr. ........ B25B 23/12 29/523
3,630,108 A * 12/1971 Stillwagon, Jr. ........ B25B 23/12 81/125
10,926,382 B2 * 2/2021 Hu ...................... B25B 23/1427
2006/0027057 A1 * 2/2006 Hsien .................. B25B 23/0035 81/177.85
2009/0165606 A1 * 7/2009 Hsien .................. B25B 23/0035 81/438
2011/0067532 A1 * 3/2011 Hung ...................... B25B 23/12 81/125
2015/0075333 A1 * 3/2015 Chen ................... B25B 23/0035 81/439
2015/0290783 A1 * 10/2015 Liu ..................... B25B 23/0035 81/177.1
2021/0354273 A1 * 11/2021 Lai ...................... B25B 23/0035
2023/0067695 A1 * 3/2023 Ko .......................... B25B 23/12
2024/0075597 A1 * 3/2024 Chiang ................... B25B 23/12

* cited by examiner

*Primary Examiner* — David B. Thomas
(74) *Attorney, Agent, or Firm* — LANWAY IPR SERVICES; Chun-Ming Shih

(57) ABSTRACT

A ratchet wrench structure includes a first body, a ratchet wheel, a second body, a control rod, and a magnetically attractive block. The first body has a first receiving recess. The ratchet wheel is pivotally mounted in the first receiving recess and has a mounting portion, a second receiving recess, and a first abutting edge. The second body is mounted in the second receiving recess and has a third receiving recess, a fourth receiving recess, and a second abutting edge. The control rod is mounted in the second body and has a third abutting edge, a press portion, a shank, and a push face. The magnetically attractive block is received in the second receiving recess and located between the second body and the first abutting edge.

9 Claims, 7 Drawing Sheets

B-B

B-B

B-B

RATCHET WRENCH STRUCTURE

BACKGROUND OF THE INVENTION

Field of the Invention

The present invention relates to a hand tool and, more particularly, to a ratchet wrench structure.

Description of the Related Art

A conventional ratchet wrench structure was disclosed in the Taiwan Patent No. M635472, and comprises a main body 10, a magnetic ring 30, and a push rod.

However, the conventional ratchet wrench structure has the following disadvantages.

1. When the main body 10 is worked, a first end of the main body 10 is drilled to form a receiving hole 11. Then, a second end of the main body 10 is drilled to form a connecting hole 12. Then, the connecting hole 12 is drilled to form a through hole 13. Thus, the main body 10 is processed by three drilling actions without two different directions, so that the main body 10 has a complicated working process. In addition, when the main body 10 disassembled and assembled, cumulative tolerance is produced.

2. The receiving hole 11 is provided with a flange 18 which stops and prevent the head 21 from being detached from the receiving hole 11. The flange 18 is formed by a stamping machine and increases the working procedure of the main body 10.

3. The magnetic ring 30 is closely fit into the through hole 13. The magnetic ring 30 is a magnet with less strength so that the magnetic ring 30 is easily broken when the magnetic ring 30 is forced into the through hole 13 by a machine.

BRIEF SUMMARY OF THE INVENTION

In accordance with the present invention, there is provided a ratchet wrench structure comprising a first body, a ratchet wheel, a second body, a control rod, and a magnetically attractive block. The first body has a first receiving recess. The ratchet wheel is pivotally mounted in the first receiving recess. The ratchet wheel has a mounting portion, a second receiving recess, and a first abutting edge. The second body is mounted in the second receiving recess. The second body is not detached from the second receiving recess. The second body has a third receiving recess, a fourth receiving recess, and a second abutting edge. The control rod is mounted in the second body. The control rod has a third abutting edge, a press portion, a shank, and a push face. The magnetically attractive block is received in the second receiving recess. The magnetically attractive block is located between the second body and the first abutting edge. Thus, the magnetically attractive block is restricted by the second body and is not detached from the second receiving recess. The magnetically attractive block is provided with a perforation.

According to the primary advantages of the present invention, when the ratchet wheel is worked, the operator only needs to drill the second receiving recess and to work the first connecting portion by turning. In addition, the second receiving recess and the first connecting portion have the same working direction. Thus, the ratchet wheel has a simplified working process without a cumulative tolerance.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
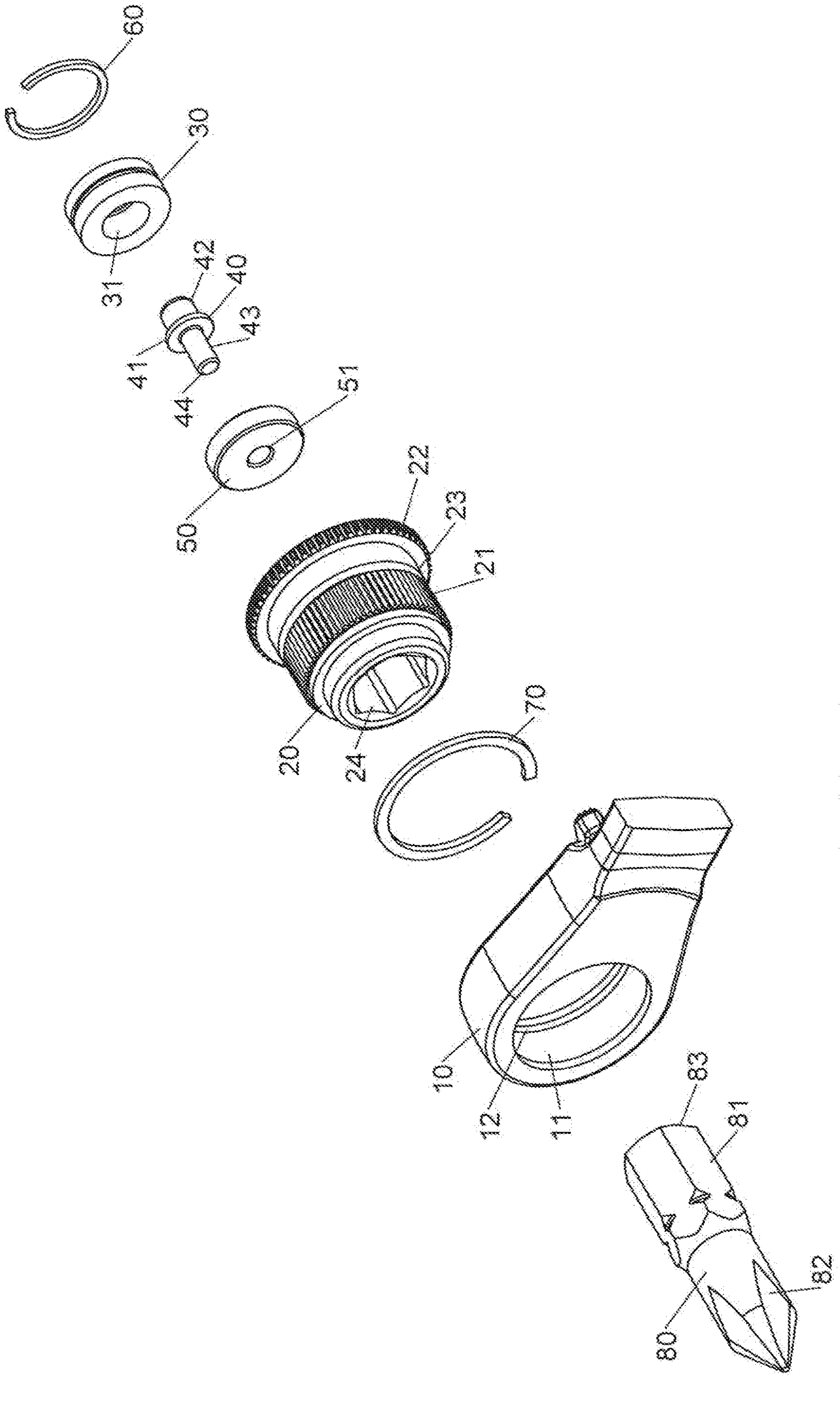
FIG. 1 is an exploded perspective view of a ratchet wrench structure in accordance with the preferred embodiment of the present invention.
Figure 4:
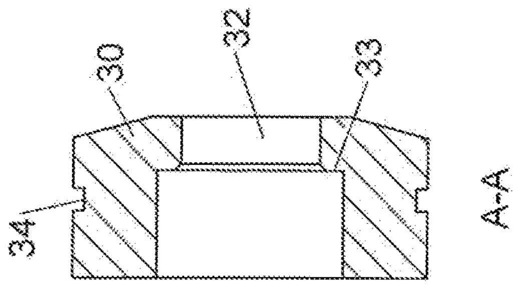
FIG. 4 is a cross-sectional view of the second body taken along line A-A as shown in FIG. 3.
Figure 3:
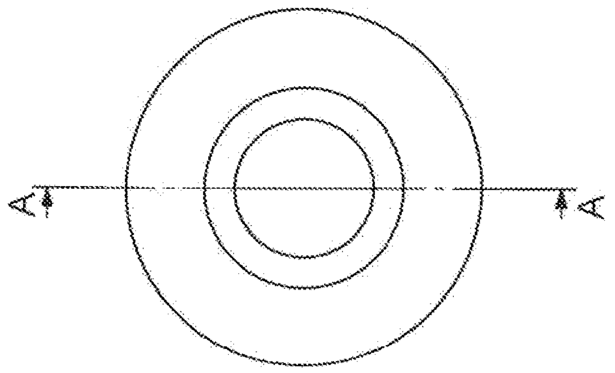
FIG. 3 is a front view of a second body of the ratchet wrench structure in accordance with the preferred embodiment of the present invention.
Figure 2:
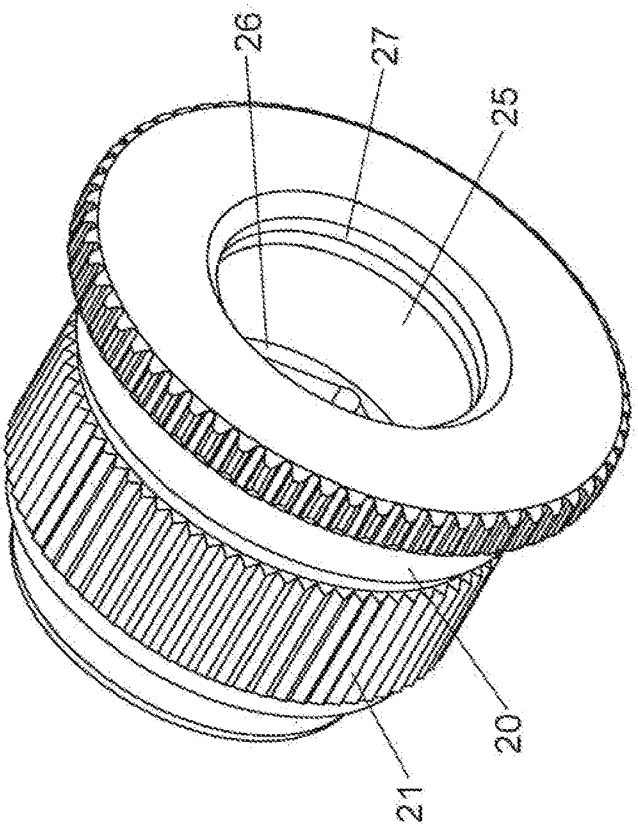
FIG. 2 is a perspective view of a ratchet wheel of the ratchet wrench structure in accordance with the preferred embodiment of the present invention.
Figure 5:
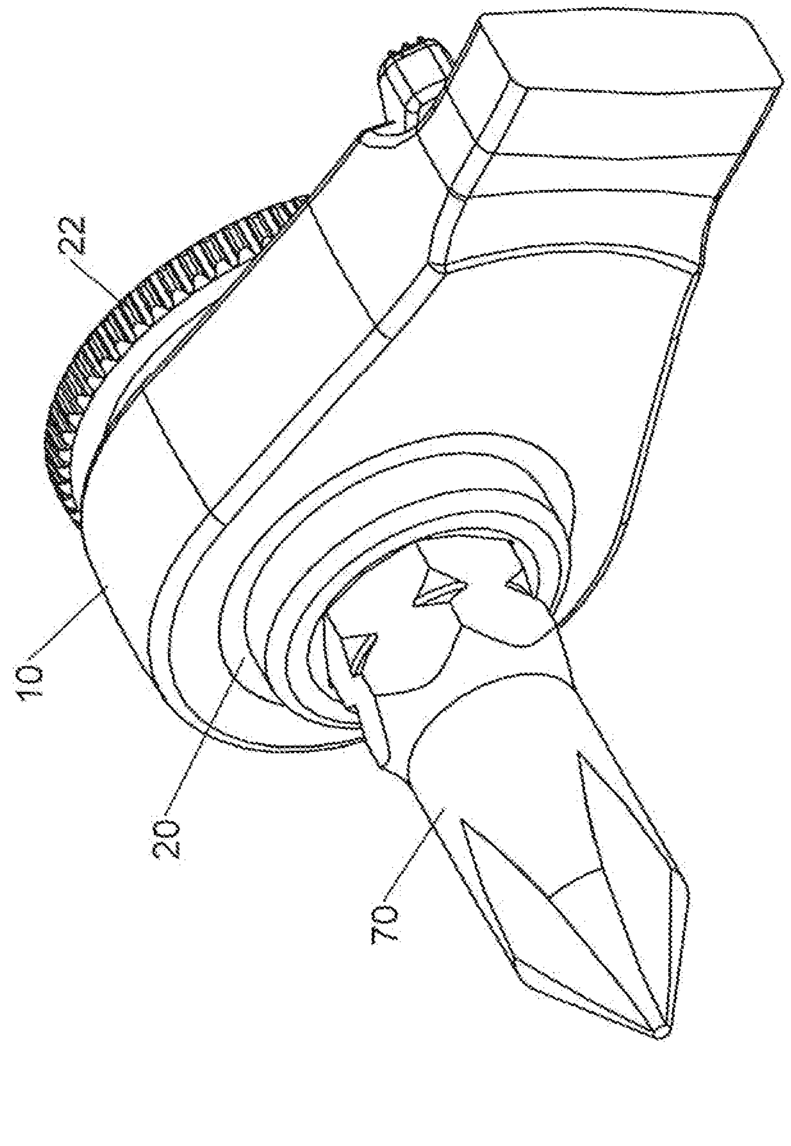
FIG. 5 is a perspective view of the ratchet wrench structure in accordance with the preferred embodiment of the present invention.
Figure 7:
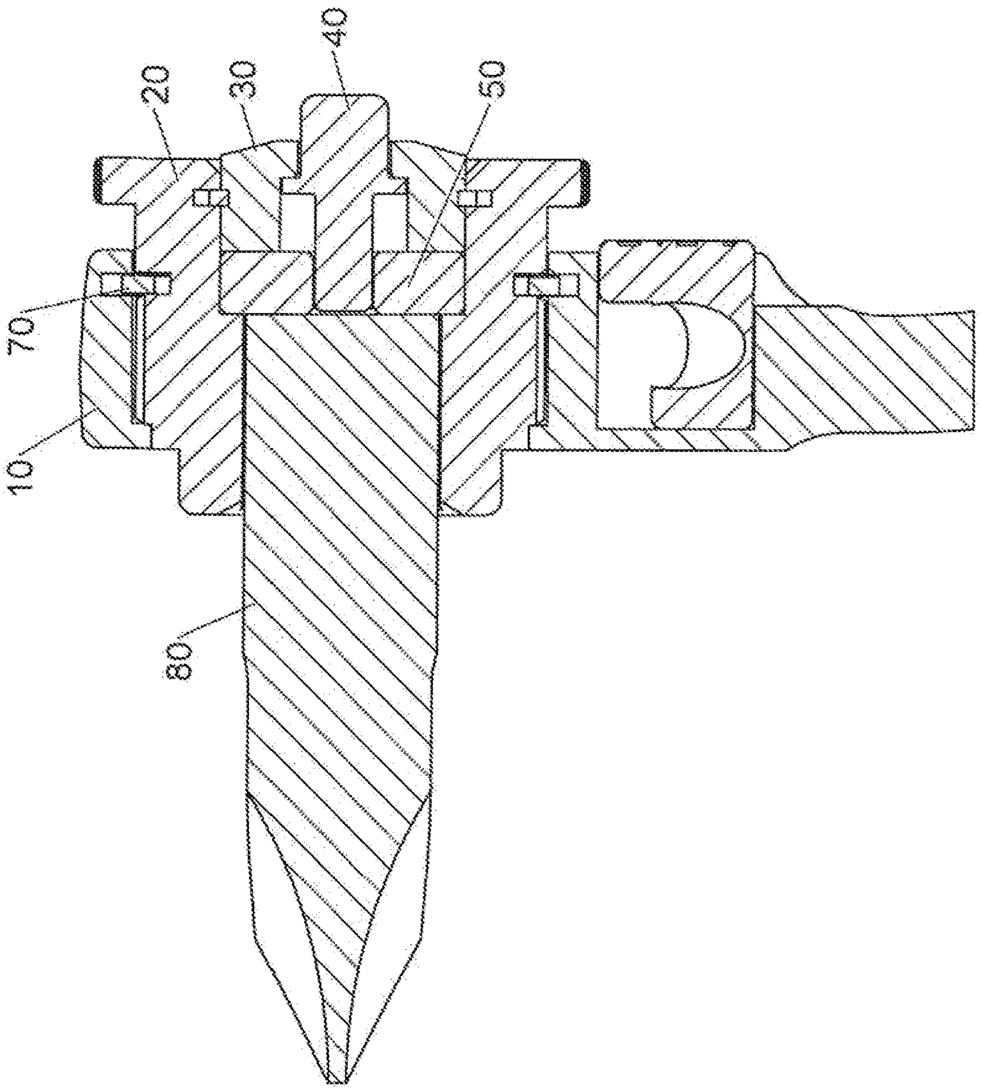
FIG. 7 is a cross-sectional view of the ratchet wrench structure taken along line B-B as shown in FIG. 6.
Figure 6:
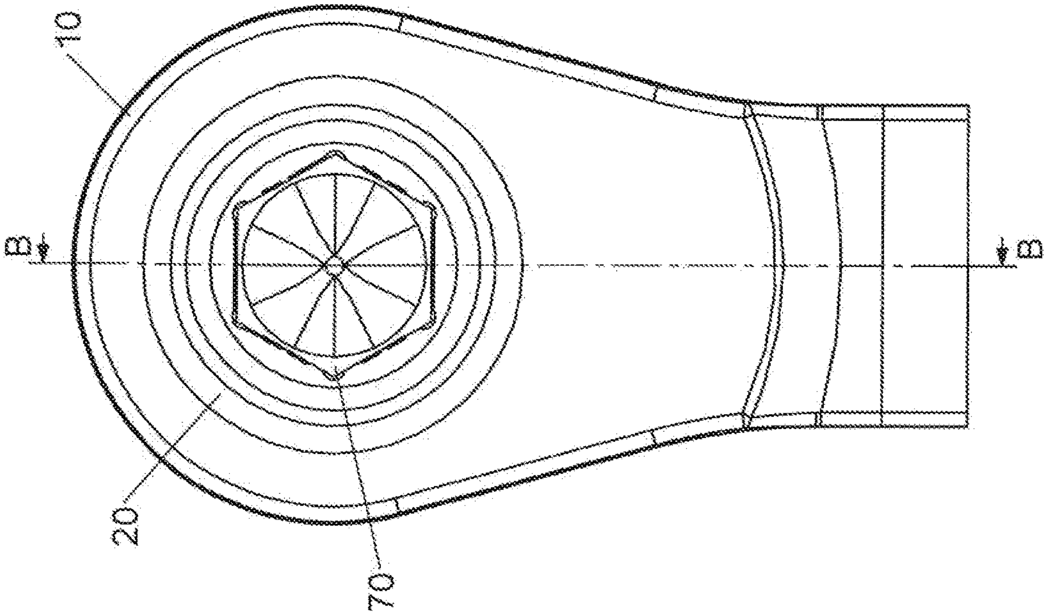
FIG. 6 is a front view of the ratchet wrench structure in accordance with the preferred embodiment of the present invention.

Referring to the drawings and initially to FIGS. 1-7, a ratchet wrench structure in accordance with the preferred embodiment of the present invention comprises a first body 10, a ratchet wheel 20, a second body 30, a control rod 40, and a magnetically attractive block 50.

The first body 10 is a wrench structure. The first body 10 is provided with a first receiving recess 11. The first receiving recess 11 penetrates the first body 10. The first receiving recess 11 is provided with a first retaining groove (or snap ring groove) 12.

The ratchet wheel 20 is pivotally mounted in the first receiving recess 11. The ratchet wheel 20 has a peripheral face provided with a ratchet wheel portion 21. The ratchet wheel portion 21 has an annular toothed shape. The ratchet wheel 20 is provided with a rotation disk 22. The rotation disk 22 has a diameter more than that of the ratchet wheel portion 21. The rotation disk 22 protrudes from the first body 10. The rotation disk 22 has a peripheral face having an annular toothed shape. The ratchet wheel 20 is provided with a second retaining groove (or snap ring groove) 23. The second retaining groove 23 aligns with the first retaining groove 12. The ratchet wheel 20 has a first end provided with a mounting portion 24. The mounting portion 24 is a hexagonal or polygonal recess. The ratchet wheel 20 has a second end provided with a second receiving recess 25. The second receiving recess 25 is connected to the mounting portion 24. The second receiving recess 25 has a circular shape. The second receiving recess 25 has an opening aligning with the rotation disk 22. The second receiving recess 25 has a diameter more than a dimension of the mounting portion 24. The ratchet wheel 20 is provided with a first abutting edge 26 formed between the second receiving recess 25 and the mounting portion 24. The second receiving recess 25 is provided with a first connecting portion (or snap-fit portion) 27. The first connecting portion 27 is an annular groove. The first connecting portion 27 is close to the opening of the second receiving recess 25.

The second body 30 is mounted in the second receiving recess 25. The second body 30 is not detached from the second receiving recess 25. The second body 30 has a first end provided with a third receiving recess 31 and a second end provided with a fourth receiving recess 32. The third receiving recess 31 is connected to the fourth receiving recess 32. The third receiving recess 31 and the fourth receiving recess 32 extend through the second body 30. The third receiving recess 31 has a diameter more than that of the fourth receiving recess 32. The second body 30 is provided with a second abutting edge 33 formed between the third receiving recess 31 and the fourth receiving recess 32. The second body 30 has a periphery provided with a second connecting portion (or snap-fit portion) 34. The second connecting portion 34 aligns with the first connecting portion 27. The second connecting portion 34 is an annular groove.

The control rod 40 is mounted in the second body 30. The control rod 40 is provided with a third abutting edge 41. The third abutting edge 41 is received in the third receiving recess 31. The third abutting edge 41 rests on or is spaced from the second abutting edge 33 to prevent the control rod 40 from being detached from the second body 30. The third abutting edge 41 has a first end provided with a press (or push) portion 42. The press portion 42 is received in the fourth receiving recess 32. The press portion 42 partially protrudes from the fourth receiving recess 32. The press portion 42 has a diameter less than that of the third abutting edge 41. The third abutting edge 41 has a second end provided with a shank 43. The shank 43 is received in the third receiving recess 31. The shank 43 has a diameter less than that of the third abutting edge 41. The shank 43 has an end provided with a push face 44. The push face 44 is directed toward the mounting portion 24.

The magnetically attractive block 50 is a ring-shaped magnet. The magnetically attractive block 50 is received in the second receiving recess 25. The magnetically attractive block 50 is located between the second body 30 and the first abutting edge 26. Thus, the magnetically attractive block 50 is restricted by the second body 30 and is not detached from the second receiving recess 25. The magnetically attractive block 50 is provided with a perforation 51. The shank 43 passes through the perforation 51. The push face 44 protrudes from or is hidden in the perforation 51. The perforation 51 has a circular shape.

In practice, when the press portion 42 of the control rod 40 is pressed or pushed, the control rod 40 is moved in the fourth receiving recess 32, the third receiving recess 31, and the perforation 51, and the push face 44 protrudes from the perforation 51.

The ratchet wrench structure further comprises a first snap ring (or retaining ring) 60, a second snap ring (or retaining ring) 70, and a screwdriver head (or tip) 80.

The first snap ring 60 is a C-shaped ring. The first snap ring 60 is elastic. The first snap ring 60 is received in and located between the first connecting portion 27 and the second connecting portion 34, so that the second body 30 is restricted by the first snap ring 60 and is not detached from the ratchet wheel 20. The control rod 40 and the magnetically attractive block 50 are restricted by the second body 30 and limited in the ratchet wheel 20 and the second body 30.

The second snap ring 70 is a C-shaped ring. The second snap ring 70 is elastic. The second snap ring 70 is received in and located between the first retaining groove 12 and the second retaining groove 23. Thus, the ratchet wheel 20 is restricted by the second snap ring 70 so that the ratchet wheel 20 is limited and rotated in the first receiving recess 11.

The screwdriver head 80 has a first end provided with an insert 81. The insert 81 has a hexagonal shape. The insert 81 is received in the mounting portion 24. The screwdriver head 80 has a second end provided with an operation (or action) portion 82. The operation portion 82 protrudes from the mounting portion 24. The insert 81 has an end face 83 abutting the magnetically attractive block 50. Thus, the screwdriver head 80 is magnetically attracted by the magnetically attractive block 50 so that the screwdriver head 80 is not released from the mounting portion 24. The end face 83 rests on the push face 44 or the end face 83 is spaced from the push face 44 with a distance being defined therebetween.

In assembly, the ratchet wheel 20 is pivotally mounted in the first receiving recess 11. The magnetically attractive block 50 is received in the second receiving recess 25. The second body 30 is mounted in the second receiving recess 25. The magnetically attractive block 50 is restricted by the second body 30 and is not detached from the second receiving recess 25. The control rod 40 is received in the third receiving recess 31. The third abutting edge 41 rests on the second abutting edge 33. The press portion 42 partially protrudes from the fourth receiving recess 32. The shank 43 is received in the third receiving recess 31 and passes through the perforation 51. The first snap ring 60 is located between the first connecting portion 27 and the second connecting portion 34. The second snap ring 70 is located between the first retaining groove 12 and the second retaining groove 23. The insert 81 is received in the mounting portion 24. The screwdriver head 80 is magnetically attracted by the magnetically attractive block 50.

Figure 8:
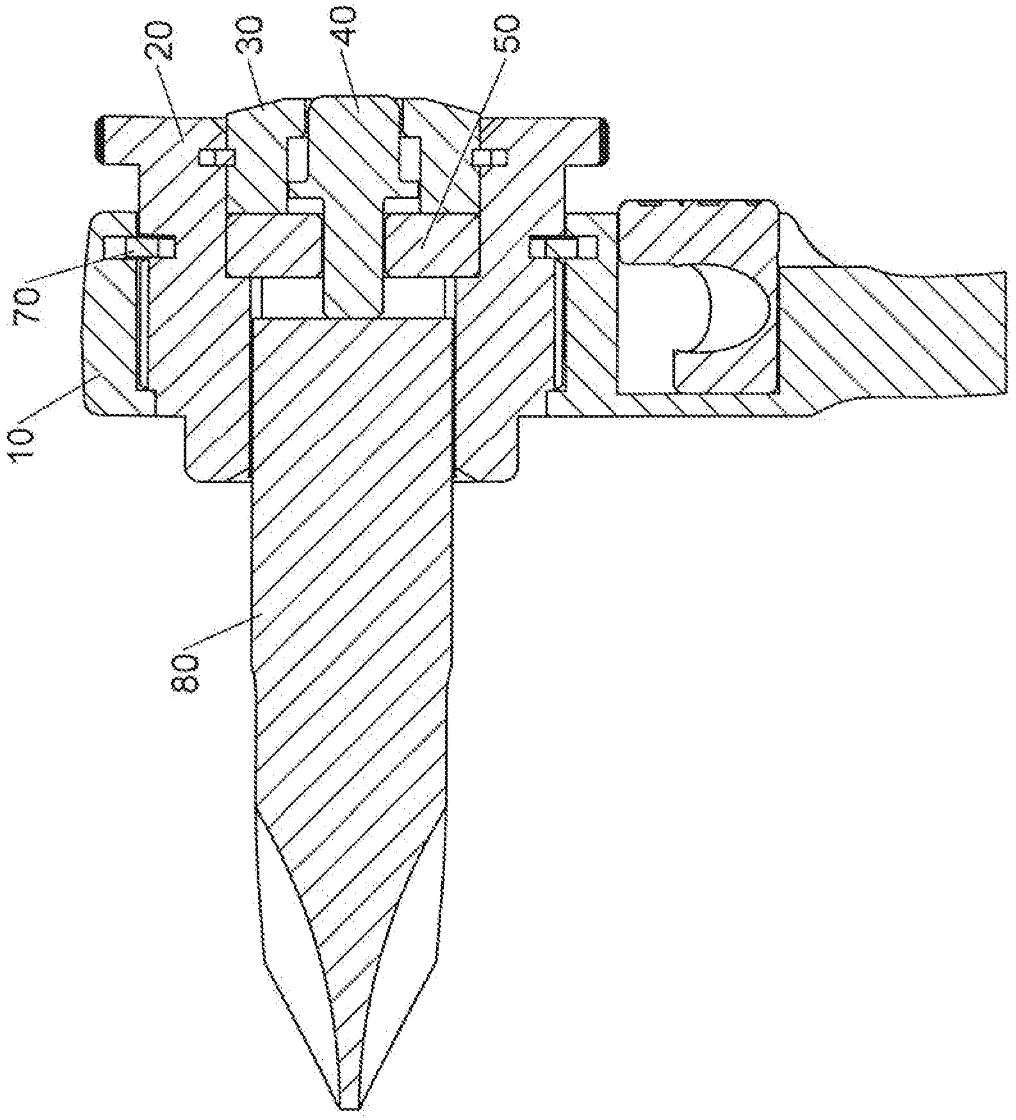
FIG. 8 is an operational view of the ratchet wrench structure as shown in FIG. 7.

In operation, referring to FIG. 8 with reference to FIGS. 1-7, when the press portion 42 is pressed, the third abutting edge 41 is moved away from the second abutting edge 33, the shank 43 is moved, the push face 44 pushes the end face 83, and the screwdriver head 80 is moved in the mounting portion 24, so that the user holds and pulls out the operation portion 82 for replacement.

Figure 9:
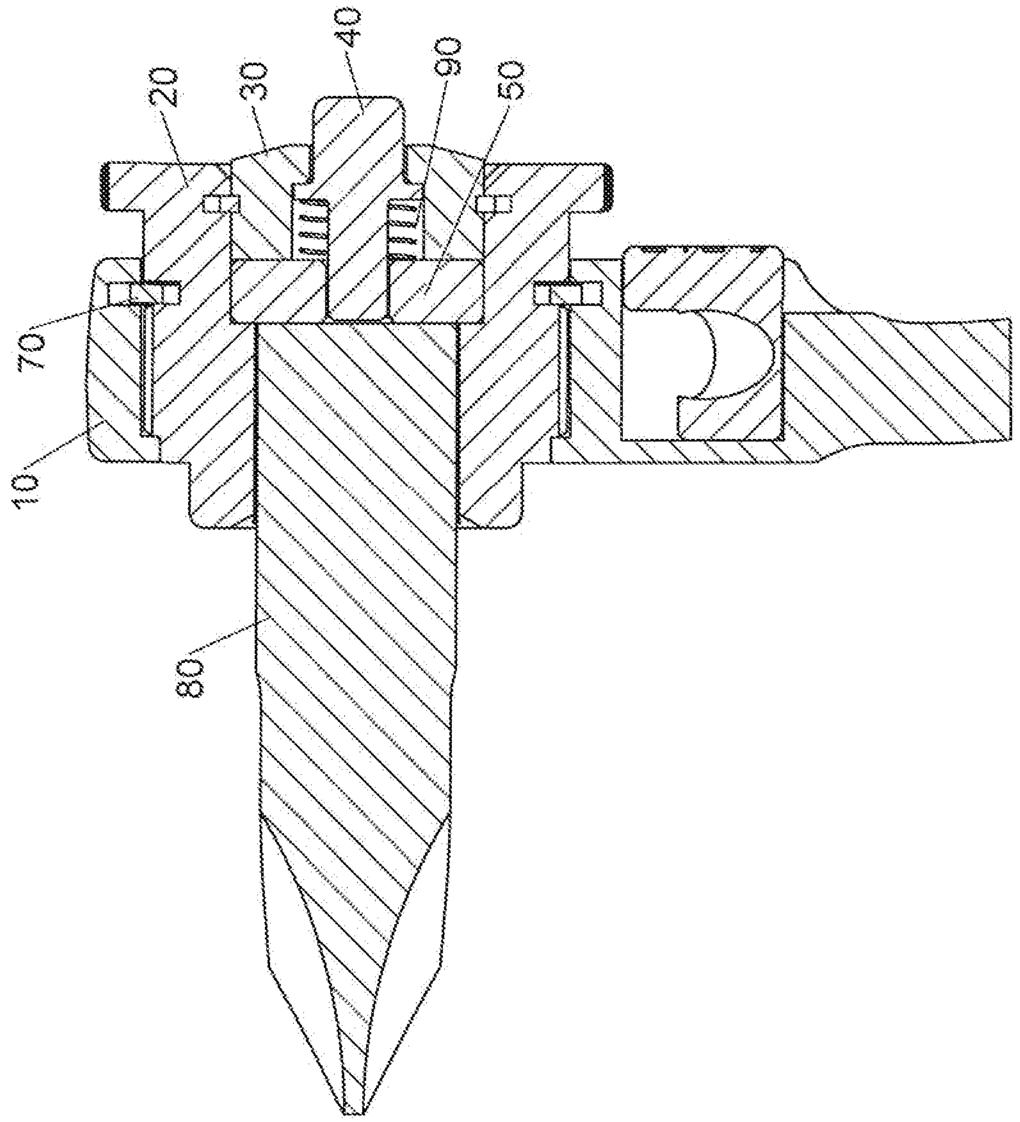
FIG. 9 is a cross-sectional view of a ratchet wrench structure in accordance with the second preferred embodiment of the present invention.

Referring to FIG. 9 with reference to FIGS. 1-7, the ratchet wrench structure further comprises an elastic member 90 received in the third receiving recess 31. The elastic member 90 is mounted on the shank 43. The elastic member 90 is biased between the magnetically attractive block 50 and the third abutting edge 41. The press portion 42 is pressed to overcome the elastic force of the elastic member 90.

Figure 10:
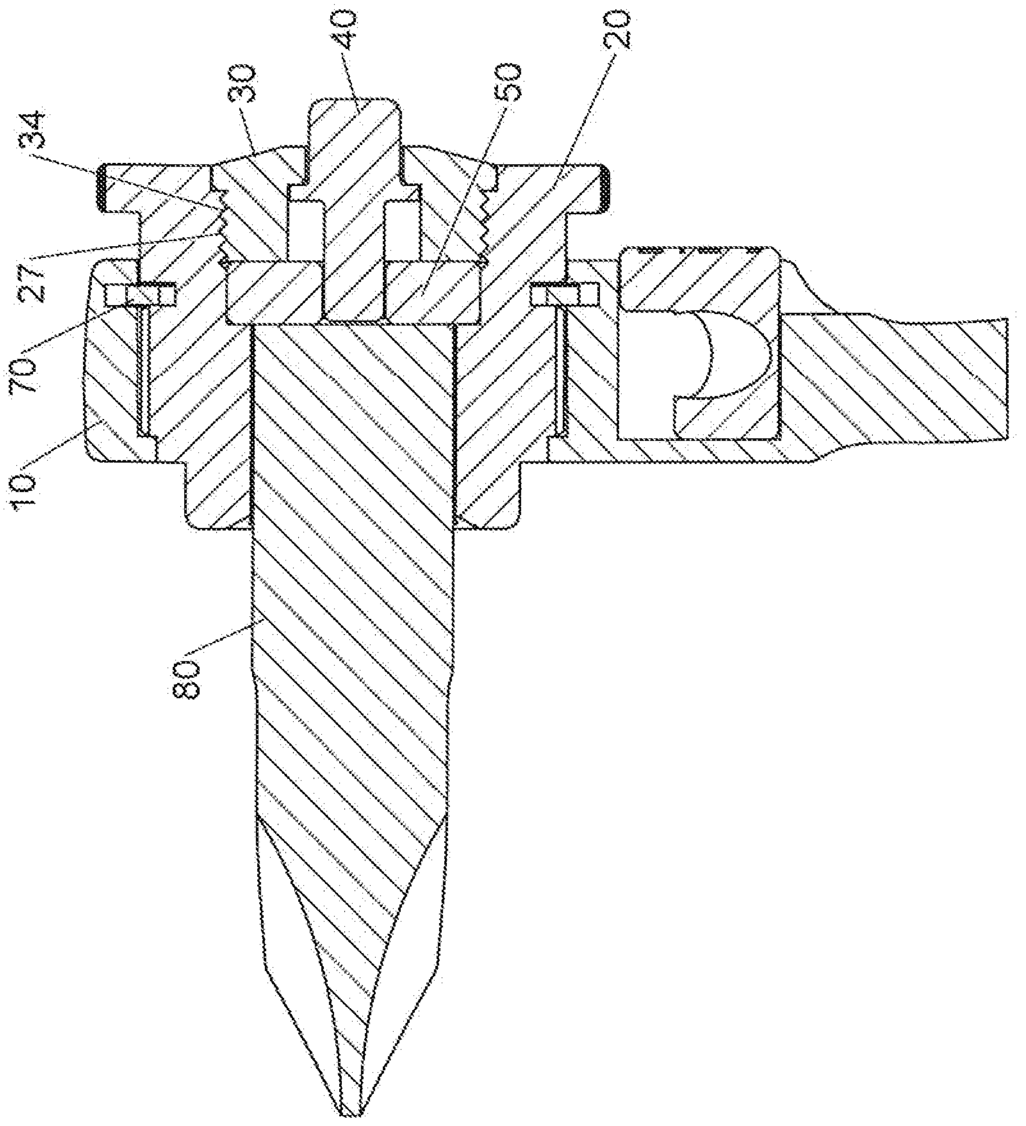
FIG. 10 is a cross-sectional view of a ratchet wrench structure in accordance with the third preferred embodiment of the present invention.

Referring to FIG. 10, the first connecting portion 27 is a thread, and the second connecting portion 34 is a thread, so that the first connecting portion 27 is screwed onto the second connecting portion 34 without needing the first snap ring 60.

In another preferred embodiment of the present invention, an adhesive is applied between the second body 30 and the second receiving recess 25 so that the second body 30 is combined with the ratchet wheel 20.

Accordingly, the ratchet wrench structure has the following advantages.

1. When the ratchet wheel 20 is worked, the operator only needs to drill the second receiving recess 25 and to work the first connecting portion 27 by turning. In addition, the second receiving recess 25 and the first connecting portion 27 have the same working direction. Thus, the ratchet wheel 20 has a simplified working process without a cumulative tolerance.
2. The second body 30 is provided with the second abutting edge 33, and the control rod 40 is provided with the third abutting edge 41 abutting the second abutting edge 33 to prevent the control rod 40 from being detached from the second body 30. Thus, the assembly is exact, and the working process is simple.
3. The magnetically attractive block 50 is restricted by the second body 30 and will not be detached from the second receiving recess 25, so that the magnetically attractive block 50 is loosely fit into the second receiving recess 25, without needing pressing action.
4. The control rod 40 and the magnetically attractive block 50 are restricted by the second body 30 and limited in the ratchet wheel 20 and the second body 30. Thus, the second body 30, the control rod 40, and the magnetically attractive block 50 are assembled simply.
5. The height of the second body 30 is changed so that the end face of the second body 30 is more protruding from the ratchet wheel 20. In such a manner, the height of the third receiving recess 31 is increased, and the length of the shank 43 is increased, so that the distance of movement of the control rod 40 is increased, and the distance of movement of the insert 81 in the mounting portion 24 is increased. Thus, the screwdriver head 80 is drawn from the mounting portion 24 more easily. That is, the distance of movement of the screwdriver head 80 is adjusted by controlling the height of the second body 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ratchet wrench structure comprising:

a first body, a ratchet wheel, a second body, a control rod, and a magnetically attractive block;

wherein:

the first body is provided with a first receiving recess;

the ratchet wheel is pivotally mounted in the first receiving recess;

the ratchet wheel has a first end provided with a mounting portion;

the mounting portion is a hexagonal or polygonal recess;

the ratchet wheel has a second end provided with a second receiving recess;

the second receiving recess is connected to the mounting portion;

the second receiving recess has a circular shape;

the second receiving recess has a diameter more than a dimension of the mounting portion;

the ratchet wheel is provided with a first abutting edge formed between the second receiving recess and the mounting portion;

the second receiving recess is provided with a first connecting portion;

the second body is mounted in the second receiving recess;

the second body is not detached from the second receiving recess;

the second body has a first end provided with a third receiving recess and a second end provided with a fourth receiving recess;

the third receiving recess is connected to the fourth receiving recess;

the third receiving recess and the fourth receiving recess extend through the second body;

the third receiving recess has a diameter more than that of the fourth receiving recess;

the second body is provided with a second abutting edge formed between the third receiving recess and the fourth receiving recess;

the second body has a periphery provided with a second connecting portion;

the second connecting portion aligns with the first connecting portion;

the control rod is mounted in the second body;

the control rod is provided with a third abutting edge;

the third abutting edge is received in the third receiving recess;

the third abutting edge rests on or is spaced from the second abutting edge to prevent the control rod from being detached from the second body;

the third abutting edge has a first end provided with a press portion;

the press portion is received in the fourth receiving recess;

the press portion partially protrudes from the fourth receiving recess;

the press portion has a diameter less than that of the third abutting edge;

the third abutting edge has a second end provided with a shank;

the shank is received in the third receiving recess;

the shank has a diameter less than that of the third abutting edge;

the shank has an end provided with a push face;

the push face is directed toward the mounting portion;

the magnetically attractive block is a ring-shaped magnet;

the magnetically attractive block is received in the second receiving recess;

the magnetically attractive block is located between the second body and the first abutting edge;

the magnetically attractive block is restricted by the second body and is not detached from the second receiving recess;

the magnetically attractive block is provided with a perforation;

the shank passes through the perforation;

the push face protrudes from or is hidden in the perforation;

the perforation has a circular shape; and when the press portion of the control rod is pressed, the control rod is moved in the fourth receiving recess, the third receiving recess, and the perforation, and the push face protrudes from the perforation.

2. The ratchet wrench structure as claimed in claim 1, wherein:

the first body is a wrench structure;

the first receiving recess penetrates the first body;

the first receiving recess is provided with a first retaining groove;

the ratchet wheel is provided with a second retaining groove;

the second retaining groove aligns with the first retaining groove;

the ratchet wrench structure further comprises a second snap ring;
the second snap ring is a C-shaped ring;
the second snap ring is elastic;
the second snap ring is received in and located between the first retaining groove and the second retaining groove; and
the ratchet wheel is restricted by the second snap ring so that the ratchet wheel is limited and rotated in the first receiving recess.

3. The ratchet wrench structure as claimed in claim 1, wherein:
the ratchet wheel has a peripheral face provided with a ratchet wheel portion;
the ratchet wheel portion has an annular toothed shape;
the ratchet wheel is provided with a rotation disk;
the rotation disk has a diameter more than that of the ratchet wheel portion;
the rotation disk protrudes from the first body;
the rotation disk has a peripheral face having an annular toothed shape; and
the second receiving recess has an opening aligning with the rotation disk.

4. The ratchet wrench structure as claimed in claim 1, wherein:
the first connecting portion is an annular groove;
the first connecting portion is close to the opening of the second receiving recess;
the second connecting portion is an annular groove;
the ratchet wrench structure further comprises a first snap ring;
the first snap ring is a C-shaped ring;
the first snap ring is elastic;
the first snap ring is received in and located between the first connecting portion and the second connecting portion, so that the second body is restricted by the first snap ring and is not detached from the ratchet wheel; and
the control rod and the magnetically attractive block are restricted by the second body and limited in the ratchet wheel and the second body.

5. The ratchet wrench structure as claimed in claim 1, further comprising:
a screwdriver head;
wherein:
the screwdriver head has a first end provided with an insert;
the insert has a hexagonal shape;
the insert is received in the mounting portion;
the screwdriver head has a second end provided with an operation portion;
the operation portion protrudes from the mounting portion;
the insert has an end face abutting the magnetically attractive block;
the screwdriver head is magnetically attracted by the magnetically attractive block so that the screwdriver head is not released from the mounting portion; and
the end face rests on the push face or the end face is spaced from the push face with a distance being defined therebetween.

6. The ratchet wrench structure as claimed in claim 5, wherein when the press portion is pressed, the third abutting edge is moved away from the second abutting edge, the shank is moved, the push face pushes the end face, and the screwdriver head is moved in the mounting portion, so that a user holds and pulls out the operation portion for replacement.

7. The ratchet wrench structure as claimed in claim 1, further comprising:
an elastic member received in the third receiving recess;
the elastic member is mounted on the shank;
the elastic member is biased between the magnetically attractive block and the third abutting edge; and
the press portion is pressed to overcome the elastic force of the elastic member.

8. The ratchet wrench structure as claimed in claim 1, wherein the first connecting portion is a thread, and the second connecting portion is a thread, so that the first connecting portion is screwed onto the second connecting portion.

9. The ratchet wrench structure as claimed in claim 1, wherein an adhesive is applied between the second body and the second receiving recess.

* * * * *